United States Patent
Schiffer et al.

(10) Patent No.: US 11,735,886 B2
(45) Date of Patent: Aug. 22, 2023

(54) SYSTEMS AND METHODS FOR COHERENT BEAM COMBINING

(71) Applicant: ELBIT SYSTEMS ELECTRO-OPTICS—ELOP LTD., Rehovot (IL)

(72) Inventors: Zeev Schiffer, Rehovot (IL); Andrey Nazarov, Rehovot (IL); Daniel Levy, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 0 days.

(21) Appl. No.: 18/147,715

(22) Filed: Dec. 29, 2022

(65) Prior Publication Data

US 2023/0134874 A1 May 4, 2023

Related U.S. Application Data

(63) Continuation of application No. PCT/IL2021/050730, filed on Jun. 16, 2021.

(30) Foreign Application Priority Data

Jul. 1, 2020 (IL) .......................................... 275783

(51) Int. Cl.
| | |
|---|---|
| H01S 3/13 | (2006.01) |
| H01S 3/101 | (2006.01) |
| H01S 3/10 | (2006.01) |
| H01S 3/136 | (2006.01) |

(52) U.S. Cl.
CPC ............ H01S 3/1307 (2013.01); H01S 3/101 (2013.01); H01S 3/10053 (2013.01); H01S 3/10061 (2013.01); H01S 3/1304 (2013.01); H01S 3/1305 (2013.01); H01S 3/136 (2013.01); H01S 3/1308 (2013.01)

(58) Field of Classification Search
CPC .... H01S 3/1304; H01S 3/1305; H01S 3/1307; H01S 3/1308; H01S 3/10053; H01S 3/10061; H01S 3/101; H01S 3/136; H01S 3/139; G02B 27/0922; G02B 27/0905; G02B 27/0961; G02B 27/0916; G02B 6/425
See application file for complete search history.

(56) References Cited

U.S. PATENT DOCUMENTS

| | | | |
|---|---|---|---|
| 11,294,192 B2 * | 4/2022 | Goodno | ................ H01S 3/1001 |
| 11,415,810 B2 * | 8/2022 | Goodno | ................ H01S 3/1301 |
| 11,422,381 B2 * | 8/2022 | Goodno | ................ H01S 3/1307 |

(Continued)

FOREIGN PATENT DOCUMENTS

JP 6104069 B2 3/2017

*Primary Examiner* — Xinning(Tom) Niu
*Assistant Examiner* — Delma R Fordé

(57) ABSTRACT

Multi-Channels coherent beam combining (CBC) using a mechanism for phase and/or polarization locking that uses a reference optical beam and an array of optical detectors each detector being configured and located to detect overall intensity of an optical interference signal caused by interfering of the reference beam and a beam of the respective channel, where the fast intensity per-channel detection allows simultaneous and quick phase/polarization locking of all channels for improving beam combining system performances.

21 Claims, 11 Drawing Sheets

(56) References Cited

U.S. PATENT DOCUMENTS

| | | |
|---|---|---|
| 2009/0134310 A1 | 5/2009 | Goodno |
| 2013/0107257 A1 | 5/2013 | Goodno et al. |
| 2018/0269648 A1 | 9/2018 | Robinson et al. |

* cited by examiner

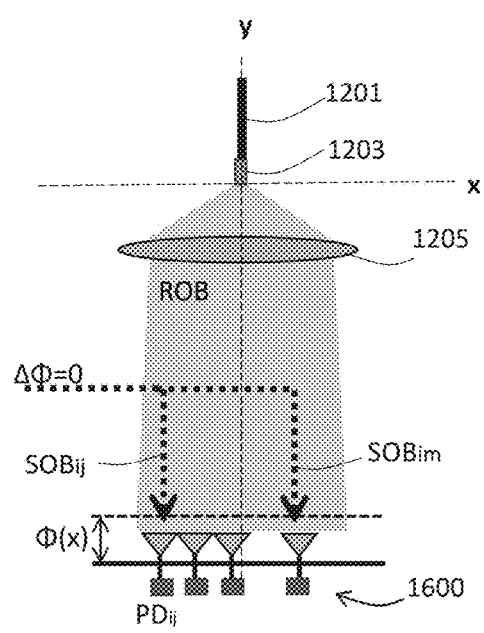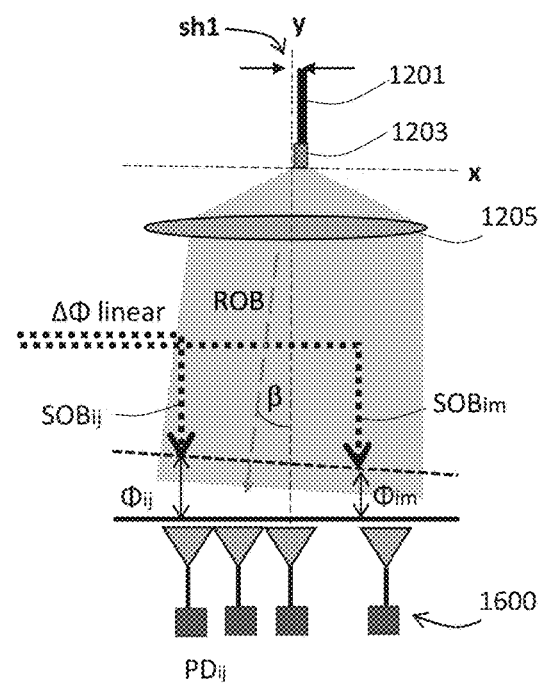
FIG. 4A
FIG. 4B
Each PD "see's" a little
different reference phase
With respect to adjacent

SYSTEMS AND METHODS FOR COHERENT BEAM COMBINING

The present disclosure relates in general to systems and methods for coherent beam combining incorporating a phase locking and/or polarization locking mechanism.

BACKGROUND

Near diffraction-limit High power lasers, such as amplification fiber lasers (fiber amplifiers), have a variety of scientific and industrial implementations and enable achieving high power output optical signals having excellent beam quality. However, for a single fiber laser, maintaining its near diffraction limit beam quality may be limited, mainly due to three physical phenomena: Stimulated Brillouin Scattering, Stimulated Raman Scattering and modal thermal instability. To overcome these limitations, techniques for combining multiple optical beams are used, which combine multiple optical beams emanating from multiple fiber lasers into a single combined optical beam.

The techniques and system layouts used for combining multiple optical beams depend, inter alia, on the spectral coherency of these optical beams, where combination of spectrally coherent optical beams, known as coherent beam combining (CBC), may be carried out by using a phased array (also known as "side-by-side CBC") such as an array of collimators, each collimating a separate optical beam. Other techniques for CBC involve using one or more diffraction grating elements (also known as "field aperture techniques").

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 4A shows combined output optical beam steering, according to some embodiments, based on reference optical beam steering using a CBC system having phase and/or polarization locking, in a case in which the reference optical beam has a planar wave-front, propagated such that the combined output optical beam is steered to a zero steering angle.

FIG. 4B shows combined output optical beam steering, according to some embodiments, based on reference optical beam steering using a CBC system having phase and/or polarization locking, in a case in which the reference optical beam has a planar wave-front, propagated such that the combined output optical beam is steered to a non-zero steering angle.

DETAILED DESCRIPTION

Figure 1A:
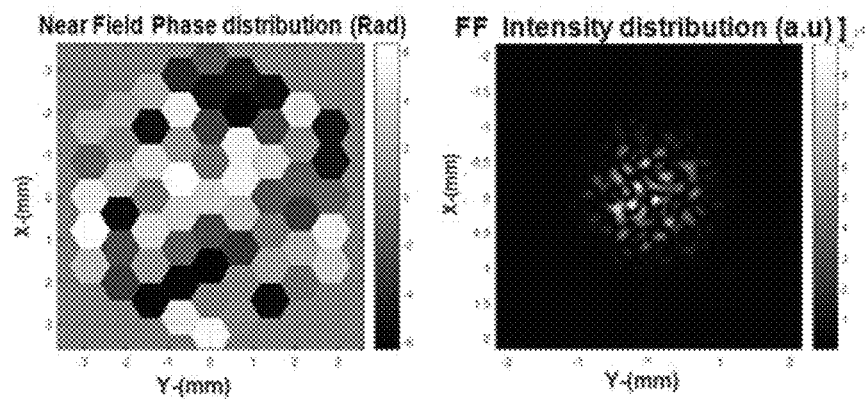
FIG. 1A shows a far field (FF) beam distribution of a CBC of multiple input optical beams having unsynchronized phases and randomly oriented polarizations.

Coherent beam combining (CBC) aims to combine a plurality of temporally coherent input optical beams having the same optical wavelength or overlapping wavelength bands into a single coherent combined optical beam of a single wavelength or a narrow wavelengths band. Implementations of CBC often require maintaining a high beam quality, e.g. enabling high far field (FF) spatial and/or spectral beam coherency.

In some cases, a plurality of optical amplifiers such as fiber lasers (e.g. doped fibers) can be used to provide the input optical beams, enabling guiding light emanating from one or more light sources and power scaling the light guided therethrough.

The term "doped optical fiber" or "doped fiber" relates to any type of optical fiber doped with one or more elements such as, yet not limited to, erbium, dysprosium, ytterbium, neodymium, thulium, praseodymium, and/or holmium.

The term "optical beam", "light beam" and/or "beam" used (interchangeably) herein may refer to any propagating electromagnetic signal, field and/or wave in the optical wavelengths range.

The term "beam quality" may relate to any one or more beam characteristics, such as, yet not limited to: wave-front (profile) quality, beam waist, beam radius, beam divergence, beam intensity/amplitude, beam brightness level (radiance), phase deviation (phase coherence), and the like and/or the maintaining over time and/or distance of these beam characteristics.

The term "temporally coherent optical beams" or "temporally coherent input optical beams", used herein, may relate to multiple optical beams having correlated electromagnetic fields, e.g. where the frequency bandwidth $\Delta f$ of the optical beams is conversely proportional to a temporal coherence time. For example, coherent optical beams may be temporally coherent by having the same signal modulation, the same or overlapping frequency/wavelength and/or the same or overlapping frequency/wavelength bandwidths.

In order to achieve CBC of FF high beam quality, the phases and polarization of the input optical beams that are to be combined should be controlled such that the phase/polarization is identical for all input optical beams, or such that the phases of the input optical beams are at desired specific differences from one another (e.g. in case of FF beam steering).

In many cases the input optical beams are of unknown phase and/or polarization, where the phase and/or polarization of each input optical beam may be unstable, i.e. rapidly change over time causing phase asynchronization between the input optical beams, which dramatically affects the FF beam quality of their combined optical beam.

Light source(s) and optical waveguides, such as fiber lasers, used as sources of the input optical beams, may be highly sensitive to environmental conditions and/or changes in those conditions such as trembling, quakes, temperature etc. such that under some environmental conditions the phase of an input optical beam may significantly change in a range of between every few milliseconds to every few microseconds. Typically polarization changes in a range of between every few seconds to every tenth of a second, under destabilizing conditions. The phase of an input optical beam typically changes at a pace that is of several scales faster than the pace of changes in the polarization, when under destabilizing conditions.

FIG. 1A shows a FF beam distribution of a CBC of multiple input optical beams having unsynchronized phases and randomly oriented polarizations. It is evident that the FF wave-front of the combined beam, in this case, will show scattered distribution of light, with no central lobe.

Figure 1B:
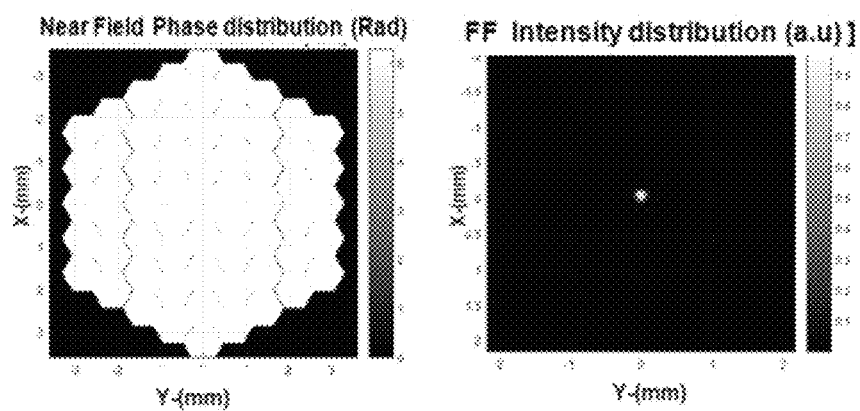
FIG. 1B shows a FF beam distribution of a CBC of multiple input optical beams having synchronized phases and orderly oriented polarizations.

FIG. 1B shows a FF beam distribution of a CBC of multiple input optical beams having synchronized phases and orderly oriented polarizations. It is evident that the FF wave-front of the combined beam, in this case, will show a central lobe concentrating most of the combined optical beam FF power onto a much smaller angular spot size, performing a high quality wave-front spatial distribution.

Aspects of disclosed embodiments pertain to systems and methods for CBC incorporating a closed-loop parallel phase locking mechanism and/or a parallel polarization locking mechanism that provide fast phase and/or polarization locking, to provide high quality and high power CBC, that can endure various environmental and other conditions and changes of such conditions, causing rapid phase and/or polarization changes.

According to some embodiments, the CBC systems and methods enable combining multiple input optical beams (defining multiple channels) with automatic multi-channel close-looped phase and/or polarization locking, e.g. by using one or more reference optical beams and multiple optical detectors, where the phase and/or polarization locking is based entirely on intensity readings from the optical detectors and does not require calculation of the optimal phase and/or polarization for each channel, thereby allowing rapid phase and/or polarization locking.

According to some embodiments, the system is configured for CBC of a M×N array of multiple temporally coherent input optical beams defining M×N channels, each channel may be defined as all transformations of a respective single input optical beam, where M and/or N are non-zero integer numbers, and wherein M indicates number of lines in the array and N indicates the number of columns in the array.

The phase/polarization locking may be performed in an ongoing parallel closed-loop manner, e.g. to all channels simultaneously and separately.

According to some embodiments, the CBC systems and methods may be configured to:

provide a M×N array of temporally coherent input optical beams and a reference optical beam;

generate M×N output optical beams corresponding to the M×N input optical beams such that the output optical beams propagate in parallel along a first propagation direction (e.g. by using a M×N array of collimating elements);

divide each of the output optical beams such that a first portion of each of the output optical beams is directed towards the first propagation direction, all first portions of the output optical beams forming a combined output optical beam, and a second portion of each of the output optical beams is directed towards a second propagation direction and used as a sample optical beam;

direct the reference optical beam, such that the reference optical beam interferes with the sample optical beams, generating a plurality of corresponding optical interference signals;

provide a plurality of M×N optical detectors, each being positioned and configured to measure an overall intensity respective of each optical interference signal, to simultaneously and continuously generate a power output value, indicative of the detected intensity of its respective optical interference signal;

automatically and separately change a phase of each of the input optical beams, while comparing the measured power output value of its corresponding optical interference signal with at least one previously measured power output value generated by the respective optical detector; and locking the phase of the input optical beam when reaching an extremum (maximum or minimum) power output value of its respective optical interference signal.

The above process may performed such that the system phase-locks each channel separately when reaching a maximum intensity of its respective interference optical signal caused in a case of a constructive interference between the reference optical beam and the respective sample optical beam; or when reaching a minimum intensity of its respective interference optical signal caused in a case of a destructive interference between the reference optical beam and the respective sample optical beam.

Aspects of disclosed embodiments provide a system for coherent beam combining (CBC) that may include:

a light source, generating a source optical beam;

a beam splitting mechanism, configured to divide the source optical beam into an array of M×N temporally coherent input optical beams and a reference optical beam;

an array of M×N collimating elements, configured to direct each of the input optical beams through a separate collimating element, generating M×N output optical beams corresponding to the input optical beams passed through the collimating elements, such that the output optical beams are parallel to one another, defining a first propagation direction;

a beam splitting element, configured to divide each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam;

a plurality of optical detectors, each being positioned and configured to measure an overall intensity of a respective optical interference signal and output a corresponding power output value;

a control subsystem, configured to continuously receive measured power output values from each of the optical detectors, change a phase of each of the input optical beams, while comparing the measured power output value of the respective optical interference signal with at least one previously measured power output value from the respective optical detector, and lock the phase of the input optical beam when reaching an extremum power output value of its respective optical interference signal.

According to some embodiments, the changing of the phase of each input optical beam may be carried out directly based on the measured power output values of its respective optical interference signals, without calculating or estimating the correct phase and/or without producing any other signal associated therewith.

According to some embodiments, the system may be set to lock the phase and/or polarization of each respective channel only for a single extremum type for all channels, i.e. locking all channels when reaching their respective maximum intensity or when reaching their respective minimum intensity.

According to some embodiments, the changing of the phase and/or the polarization of each input optical beam is carried out directly based on the measured power output values of its respective optical interference signals, without calculating, estimating or previous knowledge of the correct phase/polarization and/or without producing any other signal associated therewith. This means, that only the identification (e.g. by comparison) of the maximum/minimum intensity of the respective channel is used to automatically lock the phase/polarization of the respective channel. For example, the phase of each input optical signal may be shifted upwards or downwards at equal phase steps differing from one another by a phase shift span $\Delta\phi$ where for each phase shift, the intensity of the channel's respective interference optical signal is measured to find the extremum of the intensity of the respective channel within a time-span. According to some embodiments, the phase shift span $\Delta\phi$ may be selectively controllable and/or adjustable.

According to some embodiments, the phase/polarization locking mechanism may be configured such that an updated intensity reading (i.e. last power output value of a respective detector) is only compared to one consecutive previously measured intensity reading of the respective optical detector of the respective channel. In other embodiments several previously measured intensity readings of the respective channel within a predefined detection time span may be used to locate the extremum intensity value.

The terms "reading", "detector(s) reading", "intensity reading(s)", "intensity value" etc. may refer to and used interchangeably with the term "power output value(s)" of the optical detector(s).

According to some embodiments, the extremum value may only be identified after the phase has been shifted several times within a specific (short) time span (e.g. a microsecond), where the extremum is selected from those several measured intensities.

According to some embodiments, in order to lock the phase of a specific input optical beam, the system may be configured to shift the phase from its last state upwards or downwards e.g. by increasing or decreasing the phase, at a phase shift span $\Delta\phi$, while checking whether the intensity has been increased (in case of achieving a desired maximum extremum), in order to reach the location of the phase that provides the maximum intensity detector reading (herein "extremum phase").

According to some embodiments, the polarization of the input optical beams may be linear or elliptical polarization, where the polarization controlling mechanism (i.e. "polarization locking mechanism"), may be configured for linear or elliptical polarization control.

According to some embodiments, the process of CBC may further include controlling one or more characteristics of a wave-front of the combined output optical beam, such as far field (FF) distribution of the wave-front, FF position of a central lobe formable by the combined output optical beams, central lobe focusing characteristics, wave-front spatial configuration, environmental optical aberrations corrections etc.

In some embodiments, the controlling of the one or more wave-front characteristics may be carried out by controlling direction of a wave-front of the reference optical beam (beam steering). The beam steering may be carried out, for example by mechanically moving of an output end of an optical waveguide from which the reference optical beam is outputted, and/or by mechanically changing a relative positioning between the optical waveguide output end and a focusing lens located within the pathway of the reference optical beam.

According to some embodiments, the controlling of the one or more wave-front characteristics may be carried out by using an M×N array of phase controlling modules (PCMs), where each PCM may be positioned and configured to control the phase of a different portion of the reference optical beam interfering with a respective sample optical beam.

According to some embodiments, the PCMs used may be electronically and/or digitally controllable. For example, liquid crystal spatial light modulators (SLMs) may be used as PCMs for the phased array wave-front control, for providing low-power electronically controllable PCMs. In other cases, an array of electronically and/or mechanically controllable steering mirrors may be used.

According to some embodiments, the controlling of the one or more characteristics of the wave-front of the combined output optical beam may be done according to a FF position of a target, towards which the combined optical beam is to be directed.

According to some embodiments, the position (e.g. distance and angular positioning) of the target in relation to the combined output beam position, may be detectable, e.g. by using a target detection device or system, configured to detect at least the position of the target (e.g. 3D detector) and optionally other characteristics values of the target such as target type, speed, material composition etc., and transmit target related data (herein also "target data"), indicative of the target characteristics values to the CBC system at least for wave-front control based on received target related data.

According to some embodiments, the phase and/or polarization of the reference optical beam (φref and Pref respectively) may be steady, i.e. having substantially slower change rate than the change rate of the phase and/or polarization of the input optical beams or show no phase and/or polarization change over time.

According to some embodiments, the phase locking may be carried out by having the phase of all input optical beams synchronized with the phase of the reference optical beam e.g. equal to the phase φref of the reference optical beam or, in case of wave front steering, having each phase of each channel being shifted at a desired shift rate Δφsteer in respect to one or more adjacent channels.

For example, in case an angle of radiation $\theta_{beam,x}$ is desired (assuming a case in which only the x direction is treated and the distance between adjacent segments is equal throughout the M×N array along x and y directions) then the following phase distribution is required:

$$\varphi_{steering}(j) = j \cdot \Delta x_{seg} \cdot 2\pi \cdot \theta_{x,beam} / \lambda_{laser}$$

Where $\Delta x_{seg}$ is the size of the segment at the array system output and $\lambda_{laser}$ is the wavelength of the laser (light source). The same holds for the case of tilted beam $\theta_{beam,y}$ is desired for the y direction:

$$\varphi_{steering}(i) = i \cdot \Delta y_{seg} \cdot 2\pi \cdot \theta_{y,beam} / \lambda_{laser}$$

Where the value of the maximal phase difference between adjacent segments should be smaller than 2π.

According to some embodiments, the input optical beams and the reference optical beam may emanate from the same single light source or different light sources.

According to some embodiments, the input optical beams may emanate from a single light source or multiple light sources.

Figure 2:
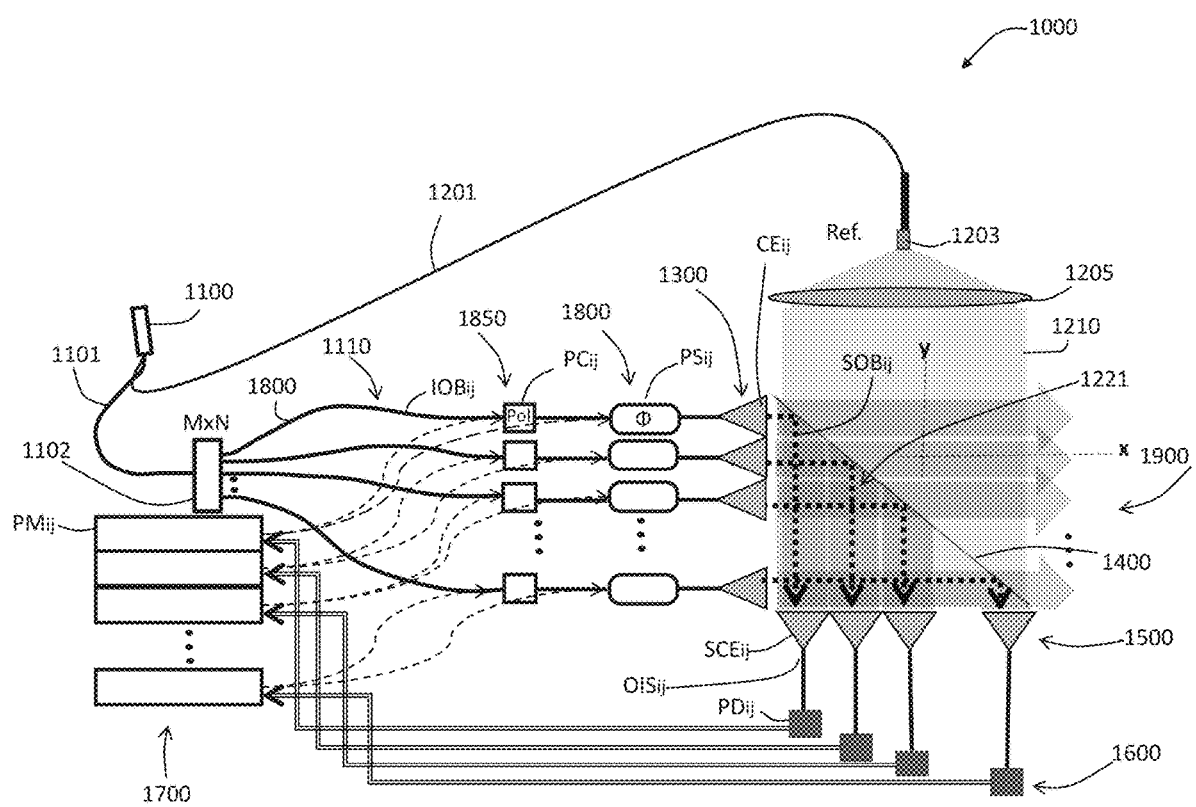
FIG. 2 shows a CBC system 1000 for combining M×N temporally coherent input optical beams, using a fast phase and polarization locking mechanisms, according to some embodiments.

Reference is now made to FIG. 2, schematically illustrating a CBC system 1000 for combining M×N temporally coherent input optical beams (IOBs), using a fast phase and polarization locking mechanisms, according to some embodiments.

The CBC system 1000 may include:

a single light source 1100, configured to output light of a single wavelength XO or a narrow wavelengths band ΛλO;

a beam splitting mechanism for dividing the output light from the light source 1100 into a reference optical beam (ROB) 1210 and a M×N IOBs 1110;

an array of M×N phase shifters (PSs) 1800, each PSij being configured for controlling the phase of a respective (different) IOBij of a respective ij channel;

an array of M×N polarization controllers (PCs) 1850, each PCij being configured for controlling polarization of a respective (different) IOBij of a respective ij channel;

a M×N array of collimating elements (CEs) 1300, each CEij being positioned and configured to collimate a respective IOBij of a different respective ij channel;

a beam splitter 1400, configured and positioned such as to simultaneously divide the incoming M×N IOBs 1110 into M×N sample optical beams (SOBs) 1221 and a combined output optical beam (COOB) 1900, where the COOB 1900 is directed towards a first a first propagation direction, defining an axis x and the SOBs 1221 are directed towards a second propagation direction defining an axis y angular to axis x (where x may be perpendicular to y), where the ROB 1210 may be directed along the y axis defined by the propagation direction of the SOBs 1221, so as to enable the SOBs 1221 to optically interfere with the ROB 1210;

an M×N array of optical detectors such as point detectors (PDs) 1600, each PDij being configured and positioned such as to detect intensity of a respective optical interference signal (OIS) i.e. OISij, which is a signal formed due to the optical interference between a respective SOBij and the ROB 1210, where each PDij may be configured to output a power output value indicative of the measured intensity of the respective channel ij at a respective time;

a control subsystem 1700, being associated with the M×N arrays of PDs 1600, PSs 1800 and PCs 1850 for enabling ongoing and parallel receiving of power output values from each the PDs 1600, and controlling phase and/or polarization of each channel, based on its respective received power output value.

According to some embodiments, the control subsystem 1700 may include an array of M×N processing modules (PMs), each PMij being configured to receive power output values of a respective PDij and control, based on received power output values from the respective PDij, the phase and polarization of the respective IOBij via the respective PCij and PSij.

According to some embodiments, the controlling of the phase and/or polarization of a respective IOBij may be carried out by gradually increasing or decreasing the phase and/or gradually changing the polarization state, e.g. such as to provide, for example, an increase in the intensity (power output value) in the PDij reading, for locking the phase and/or polarization upon reaching a maximum interference optical signal value. This can be done by comparing a currently PDij reading with one or more previously measured intensities of the respective ij channel. According to some embodiments, it may be required to step back from a current phase and/or polarization value once the intensity extremum is passed.

According to some embodiments, the control subsystem 1700 may include one or more processing, control and/or memory modules, for enabling (temporary and/or long term) storage of current and previously measured power output values of each PD, for processing the received power output values for identification of an extremum phase and/or polarization of each channel and/or for controlling at least the PCs 1850 and/or the PSs 1800 for optimal (lock) phase/polarization identification and for phase/polarization locking of each channel e.g. by sending control commands that indicate only increase/decrease direction for the phase/polarization shift.

According to some embodiments, the phase and/or polarization control may also include controlling the phase and/or polarization shift span. For example, the phase shift span may be reduced once an area in which an extremum intensity is identified, to fine-tune the phase locking.

According to some embodiments, as illustrated in FIG. 2, the CBC system 1000 may further include:

a first optical waveguide 1101, which may be an optical fiber, connecting to one output node of the light source 1100 and configured to guide the light from the light source 1100 to a beam dividing device 1102 configured to device the light guided by the first optical waveguide 1101 into the M×N IOBs 1110, e.g. by having M×N optical fibers guiding the M×N IOBs 1110;

a second optical waveguide 1201, such as a second optical fiber, connecting to a second output node of the light source 1100 and configured for guiding the light to its distal fiber end, which may be held by a ferrule holder element 1203 for outputting therefrom the ROB 1210; and a reference beam collimator 1205 such as one or more collimating lenses, mirrors, and/or a diffractive optical element (DOE), position in respect to the positioning of the output end of the second optical waveguide e.g. the edge of the holder element 1203 such that the ROB 1210 is to be collimated (e.g. by positioning the reference beam collimator 1205 at the focal plane and/or point of the reference beam collimator 1205).

According to some embodiments, as shown in FIG. 2, the CBC system 1000 may further include a M×N array of sampling collimating elements (SCEs) 1500, each SCEij being positioned and configured to intensify (e.g. by focusing) received light signal resulting from interference of the SOBij and the ROB 1210, of respective ij channel, onto a respective PDij.

According to some embodiments, the light source 1100 may include any type of light source that can output light at a single wavelength and/or a single narrow wavelengths band, such as a light emitting diode (LED), a monochromatic and/or tunable laser device etc.

According to some embodiments each PSij may be configured to control the phase of the respective IOBij by being electronically controlled and/or computer-controlled, e.g. by having its respective PMij being configured to change the phase based on received signal power value, input voltage or current value etc., applied to the respective PSij. The received signal power value may only be indicative of the phase shift direction (increase or decrease).

According to some embodiments each PMij may be configured to control the polarization of the respective IOBij by being electronically controlled and/or computer-controlled, e.g. by having its respective PMij being configured to change the polarization based on received signal power value, input voltage or current value etc., applied to the respective PMij. The received signal power value may only be indicative of the polarization deviation state (e.g. in case of an elliptic polarization, changing ellipticity and/or angle of the polarization vector(s)).

According to some embodiments, each PSij may include any type of phase shifting device and/or element configured to receive control commands (e.g. input power/voltage change), and shift the phase of the respective IOBij accordingly within a time span that is preferably faster than the natural IOBs phase changes time rates. The PSs 1800 may include for example, spatial light modulators (SLMs), devices including electrically/electronically controllable deformable mirrors, micro-electro-mechanical systems (MEMS), such as micro-electro-mechanical optics (e.g. mirrors), etc.

According to some embodiments, each PCij may include any type of polarization controlling device and/or element configured to receive control commands (e.g. input power/voltage change), and change the polarization state of the respective IOBij accordingly within a time span that is preferably faster than the IOBs natural polarization changes time rates. The PCs 1850 may include for example, piezoelectric element(s) based controllers, LiNO2 (LN) controllers, etc.

Figure 3A:
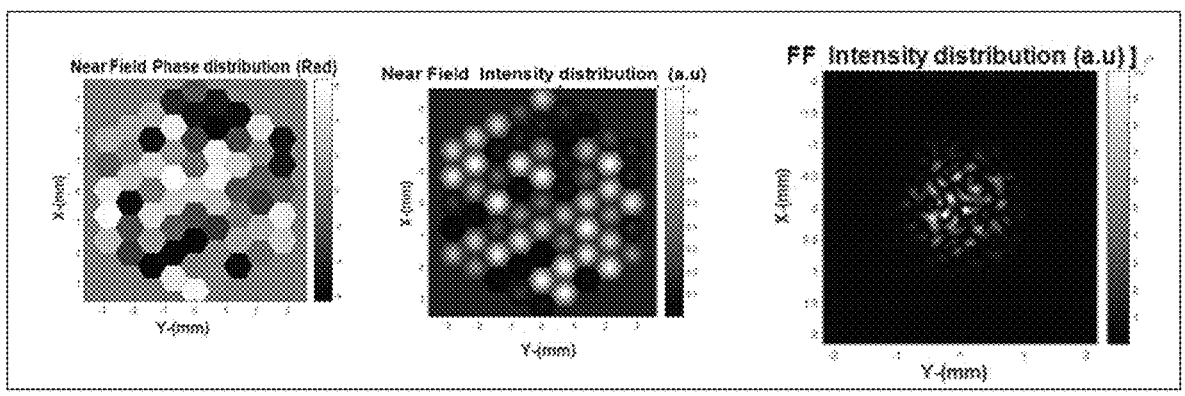
FIG. 3A shows a FF beam distribution of a CBC of multiple input optical beams having unsynchronized phases and randomly oriented polarizations.
Figure 3B:
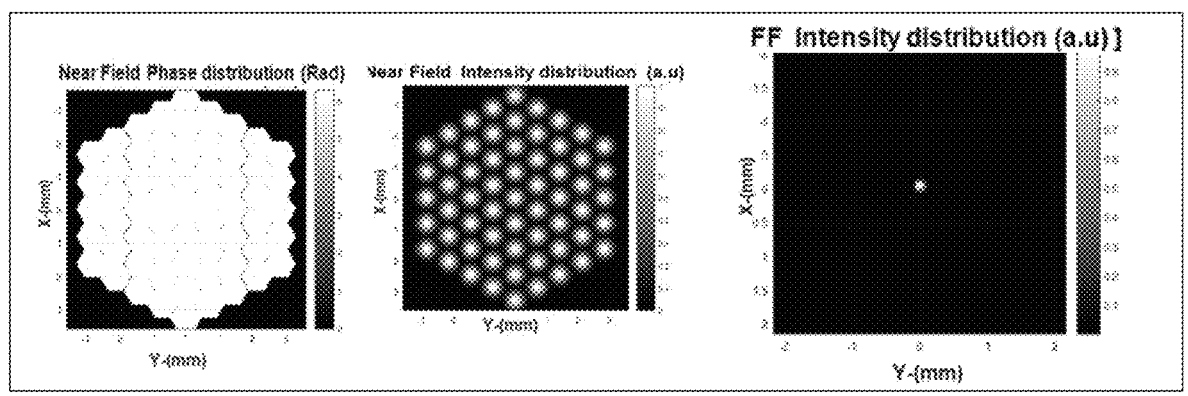
FIG. 3B shows a FF beam distribution of a CBC of multiple input optical beams having locked synchronized phases and locked and orderly oriented polarizations, using a CBC system with a phase and polarization locking mechanisms, according to some embodiments.

FIGS. 3A and 3B show resulting effect of using a fast CBC system with a phase lock mechanism as illustrated above: FIG. 3A shows a resulting FF beam distribution of a CBC of multiple input optical beams having unsynchronized phases and polarizations and FIG. 3B, show a result of using fast CBC system having the phase lock mechanism.

Reference is now made to FIGS. 4A, 4B, 4C and 4D showing a COOB 1900 wave-front control mechanism, enabling beam steering of the COOB 1900 by controlling a relative positioning between the reference beam collimator 1205 and the holder element 1203 holding an output node of the second optical waveguide 1201 guiding the reference optical beam (ROB), according to some embodiments.

FIG. 4A shows a ROB having a planar wave-front, propagated along the y axis. In this case, both the holder element 1203 and the reference beam collimator 1205 are positioned such that the planar ROB is propagated along the axis y where the focal point of the reference beam collimator 1205 is also located. In this configuration, all SOBs are directed through the same optical path length (OPL), and in parallel to the propagation direction of the ROB, where upon operation of the CBC system 1000 the phases and/or polarizations of all channels will automatically lock to the same phase and/or polarization resulting in a COOB 1900 having a planar wave-front that is steered (directed) in parallel to the x axis (perpendicular to the direction of the ROB).

FIG. 4B shows a ROB having a planar wave-front, propagated angularly to the y axis, e.g. at a non-zero angle $\beta$ in respect to the y axis. The resulting COOB in that case will be at angle $-\beta$.

In this case, the holder element 1203 is located with a shifted distance from the axis defined by the focal point of the reference beam collimator 1205 e.g. by shifting the holder element 1203 and/or the reference beam collimator 1205 along the x axis. In this configuration, each SOB of each j column of the M×N channels is directed through a different optical path length (OPL) and interferes with the angularly shifted ROB. In this case, upon operation of the CBC system 1000, the phases and/or polarizations of adjacent channels of a respective column j will automatically lock to different phases and/or polarizations according to:

$$\Delta x_{steering} = F_1 \cdot \beta$$

Where $F_1$ is the focal length of the beam collimator 1205. The automatic phase difference between adjacent channels (segments) will be:

$$\Delta \varphi_{steering} = -\Delta x_{seg} \cdot 2\pi \cdot \beta_{x,beam} / \lambda_{laser}$$

resulting in a COOB 1900 having a planar wave-front that is steered (directed) angularly to the x axis, where the different phases and/or polarizations will be automatically locked (without having to calculate them) upon reaching the extremum intensity reading from their respective PDs, thereby provide fast, automatic phase/polarization locking with optimal wave-front steering.

Figure 4C:
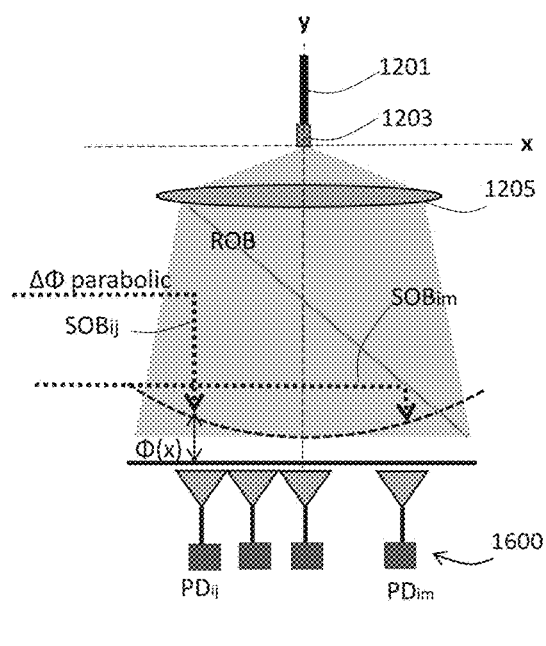
FIG. 4C shows combined output optical beam steering, according to some embodiments, based on reference optical beam steering using a CBC system having phase and/or polarization locking, in a case in which the reference optical beam has a parabolic wave-front, propagated such that the combined output optical beam is steered to a zero steering angle.

FIG. 4C shows a ROB having a parabolic wave-front, propagated in parabolic symmetry about the y axis. In this case, both the holder element 1203 and the reference beam collimator 1205 are positioned such that the parabolic ROB is propagated symmetrically about the axis y where the focal point of the reference beam collimator 1205 is also located. In this configuration, upon operation of the CBC system 1000 the phases and/or polarizations of all channels will automatically lock to the optimal phases and/or polarizations resulting in a COOB 1900 having a parabolic wave-front that is steered (directed) in parallel to the x axis (perpendicular to the direction of the ROB).

Figure 4D:
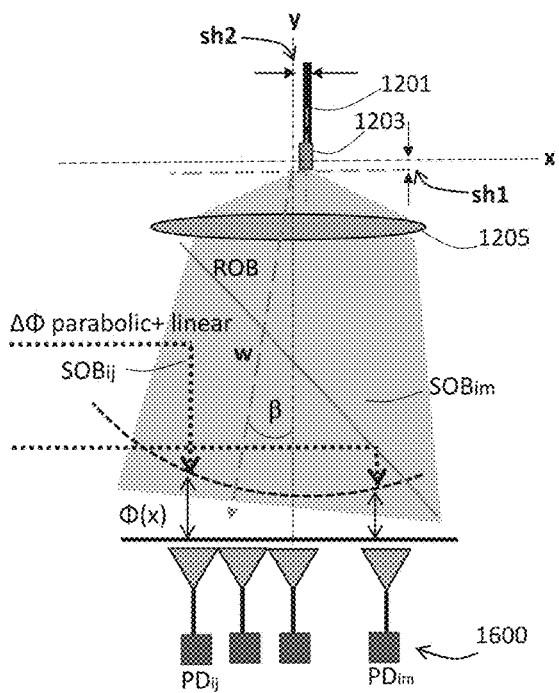
FIG. 4D shows combined output optical beam steering, according to some embodiments, based on reference optical beam steering using a CBC system having phase and/or polarization locking, in a case in which the reference optical beam has a parabolic wave-front, propagated such that the combined output optical beam is steered to a non-zero steering angle.

FIG. 4D shows a ROB having a parabolic wave-front, propagated in symmetry about and axis w which forms a non-zero angle $\beta$ with the y axis. In this case, the holder element 1203 and the focal point of the reference beam collimator 1205 may be shifted from one another at sh1 along axis x and sh2 along axis y. This may be achieved by shifting (moving) the holder element 1203 and/or the reference beam collimator 1205 along the x and y axes.

In this configuration, upon operation of the CBC system 1000 the phases and/or polarizations of channels of a respective column j will automatically lock the optimal phases and/or polarizations resulting in a COOB 1900 having a parabolic wave-front that is steered (directed) angularly, in respect to the x and/or y axes.

According to some embodiments, in order to enable steering wave-front control, the CBC system 1000 may further include a steering mechanism that enable control (e.g. electronic-based and/or computer-based control) of one or more mechanical elements and/or devices for physically changing the relative positioning between the focal point axis of the reference beam collimator 1205 and the ROB initial output direction when exiting the reference beam optical waveguide output node.

Figure 5A:
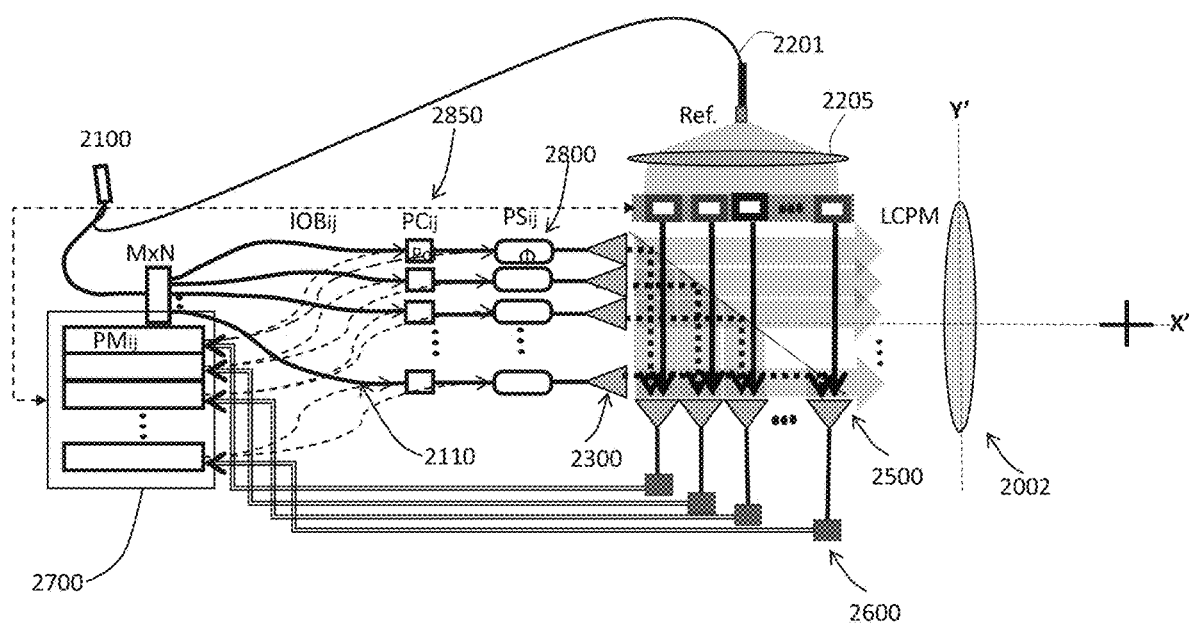
FIG. 5A shows a CBC system configured to enable phase and/or polarization locking having a controllable phased array wave-front control mechanism including multiple phase control modules, according to some embodiments.
Figure 5B:
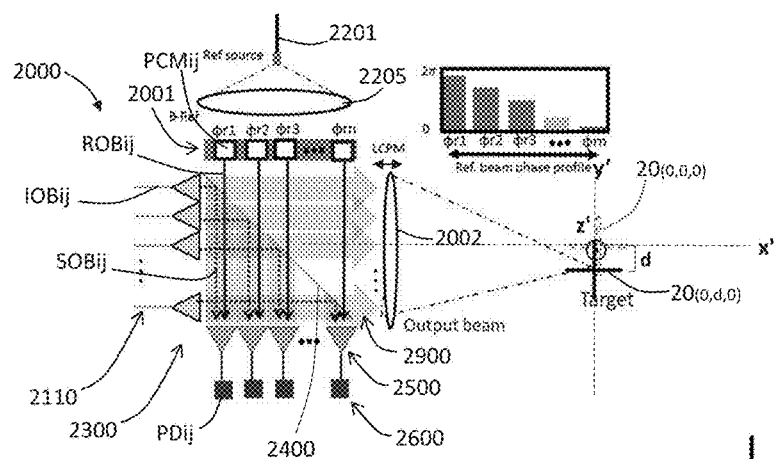
FIG. 5B shows the CBC system of FIG. 5A, used for wave-front steering control, according to some embodiments.
Figure 5C:
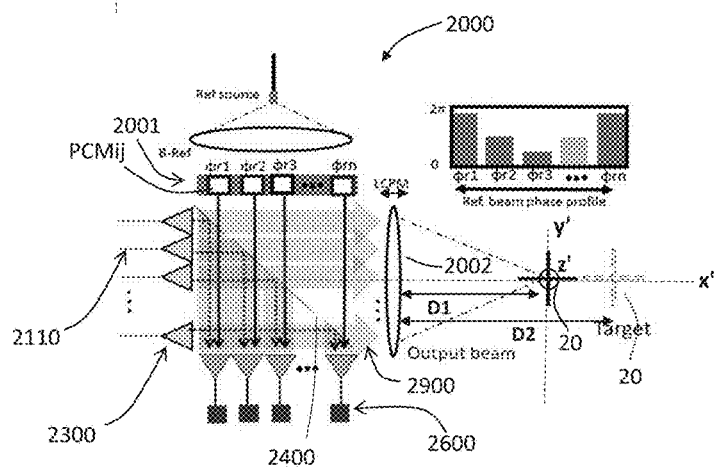
FIG. 5C shows the CBC system of FIG. 5A, used for wave-front collimation control, according to some embodiments.

Reference is now made to FIGS. 5A, 5B and 5C showing a CBC system 2000 configured to enable phase and/or polarization locking as well as to control a wave-front of the combined output optical beam, by using an electronically controllable phased array wave-front control mechanism including multiple PCMs 2850, according to some embodiments.

The CBC system 2000 may include any mechanism for providing and controlling an M×N array of IOBs 2110 and directing thereof towards a beam splitter 2400 (e.g. by using an M×N array of collimating elements 2300), for dividing the IOBs 2110 into a COOB 2900 propagating to a first propagation direction along an x' axis, and to an array of M×N SOBs propagated along a second propagation direction (e.g. perpendicular to the first propagation direction parallel to axis y'), while controlling each phase and/or polarization of each separate IOB via M×N arrays of PSs 2800 and PCs 2850, respectively, e.g. by using a control subsystem 2700, operatively associated therewith.

The CBC system 2000 may further include a M×N array of electronically controlled and/or computer-controlled PCMs 2001, a M×N array of PDs 2600, a reference optical beam source 2201, a reference beam collimator 2205 and an output collimator 2002 configured to focus the COOB 2900.

The PCMs 2001 may be located between the beam splitter 2400 and the reference beam source 2201 (e.g. after the reference beam collimator 2205), so as to have each portion of the reference optical beam (herein reference optical beam (ROB) of each ij channel (i.e. ROBij)) being phase-shifted in a separately controllable manner, for example to enable beam steering of the COOB 2900.

The PMCs 2001 may include, for example, liquid crystal SLMs, each being separately electronically controllable, enabling to set a different phase for each ROB of each channel, e.g. to enable beam steering of the COOB 2900.

The phase and/or polarization locking may be carried out by a closed loop iterative changing of the phase and/or polarization of each IOBij, based on intensity readings from its associated PDij, such that the phase and/or polarization of each channel ij is locked when the intensity reading of the respective PDij of the channel is set on a maximum/minimum intensity value. The maximum intensity value, for example, for each channel ij, may be achieved, when the interference of the respective IOBij and ROBij is fully constructive, producing a respective maximum intensity of the OISij.

For example, if a target 20 is located over an x'z' plane (as illustrated in FIG. 5B), at the FF from the CBC system 2000, then if the target is located at 0,0,0, location of the x'y'z' axes (e.g. where x' is defined by the propagation direction of the COOB 2900), the phases of all IOBs should be equal to one another. In this case, the PCMs may be set such that all phases of all ROBs are equal to one another, in order to enable the CBC system 2000 to automatically lock each of the IOBs 2110 upon reaching an extremum intensity value of their respective OISs. If the target is located at a shifted position, for example at a d shifted position from the 0,0,0 position of the x'y'z' axes, (e.g. at a position of 0,d,0 as shown in FIG. 5B), then the phases of the ROBs of each column N, may each be set to a different value, in order to steer the wave-front of the COOB 2900 to the target 20 location 0,d,0, by having each of the IOBs 2110 automatically lock to the optimal (different) phase value, upon reaching maximum/minimum intensity value of their corresponding OISs.

According to some embodiments, an output beam collimating device 2002 such as one or more focusing lenses, may be used to enable controlling focusing positioning such as focal length of the COOB 2900.

In cases in which the wave-front control for the COOB 2900 additionally or alternatively requires focus control of the COOB wave-front, e.g. by controlling the focal point or plane of the COOB 2900, the output beam collimating device 2002 may enable mechanical shifting of relative positionings of one or more collimating elements (e.g. lenses) thereof, in an electronically and/or computer controllable manner.

FIG. 5C shows exemplary cases, in which the target 20 can be positioned along the x' axis at a focal length D1 of the output beam collimating device 2002 or shifted a length D2 along the x' axis, in the latter case, the output beam collimating device 2002 may be adjusted (e.g. by electronically controlling relative positioning of several lenses) to focus the COOB 2900 to a focal length of D2.

According to some embodiments, the CBC system 2000 may further include a M×N array of sampling collimating elements (SCEs) 2500, each SCEij being positioned and configured to focus light resulting from interference of the SOBij and the ROBij 1210, of respective ij channel, onto a respective PDij.

According to some embodiments, the IOBs 2110 and the ROB may all originate from a single monochromatic light source such as light source 2100.

Figure 6:
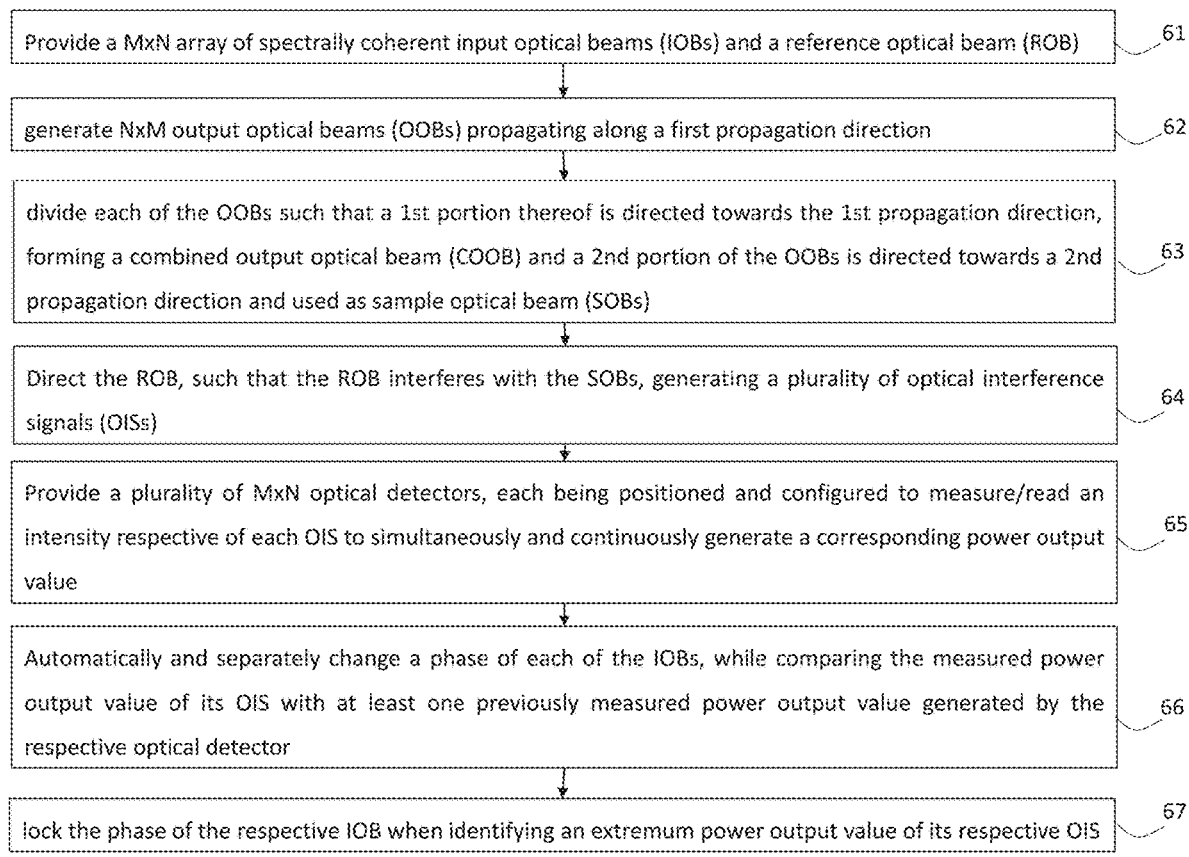
FIG. 6 shows a process for CBC phase locking, according to some embodiments.

Reference is now made to FIG. 6 showing a process for CBC phase locking, according to some embodiments. The process may include:

providing a M×N array of temporally coherent input optical beams and a reference optical beam 61;

generating M×N output optical beams corresponding to the M×N input optical beams such that the output optical beams propagate along a first propagation direction 62;

dividing each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam 63;

directing the reference optical beam, such that the reference optical beam interferes with the sample optical beams, generating a plurality of optical interference signals 64;

providing a plurality of M×N optical detectors, each being positioned and configured to measure an intensity respective of each optical interference signal of the plurality of optical interference signals to simultaneously and continuously generate a corresponding power output value 65;

automatically and separately changing a phase of each of the input optical beams, while comparing the measured power output value of the respective optical interference signal with at least one previously measured power output value generated by the respective optical detector; wherein the changing of the phase of each input optical beam is carried out directly based on the measured power output value of its respective optical interference signal 66; and locking the phase of each respective input optical beam when reaching an extremum power output value of its respective optical interference signal 67.

Figure 7:
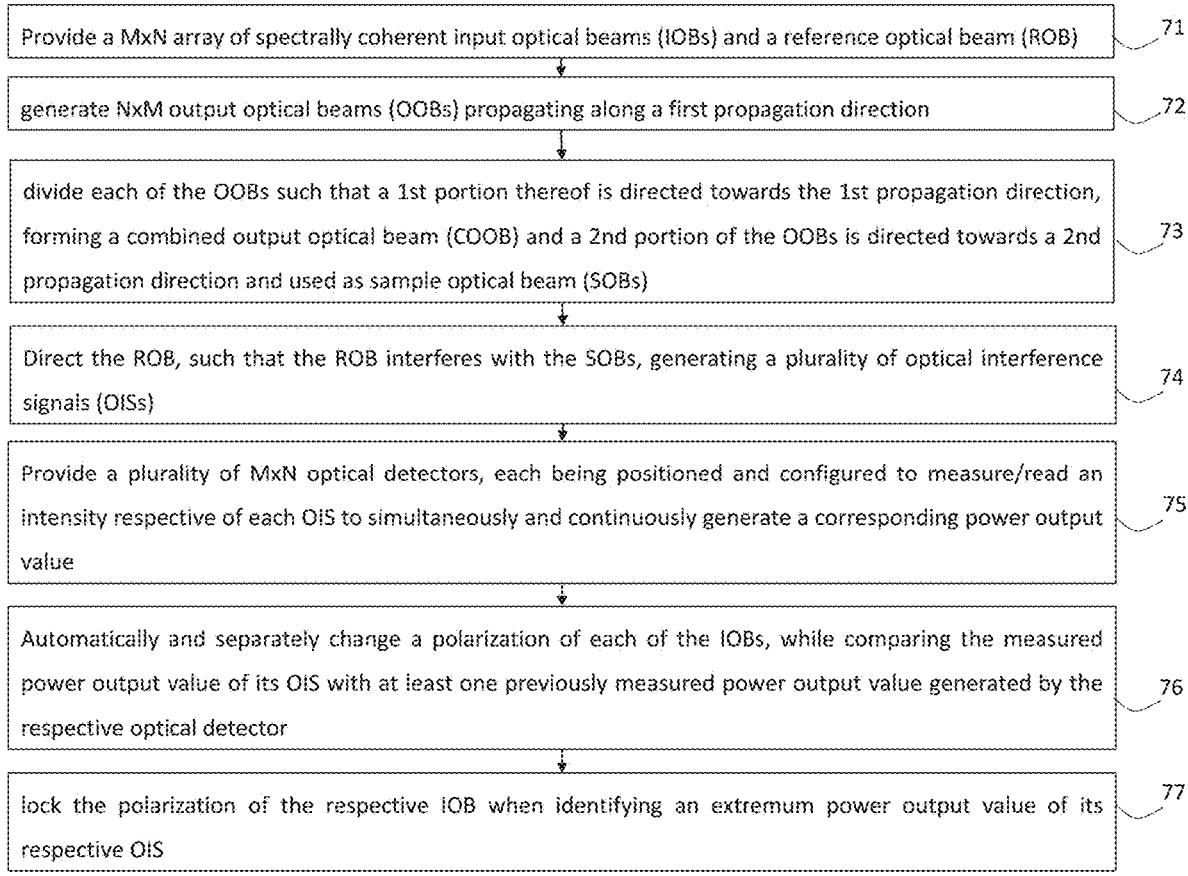
FIG. 7 shows a process for CBC polarization locking, according to some embodiments.

Reference is now made to FIG. 7 showing a process for CBC polarization locking, according to some embodiments. The process may include:

providing a M×N array of temporally coherent input optical beams and a reference optical beam 71;

generating M×N output optical beams corresponding to the M×N input optical beams such that the output optical beams propagate along a first propagation direction 72;

dividing each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam 73;

directing the reference optical beam, such that the reference optical beam interferes with the sample optical beams, generating a plurality of optical interference signals 74;

providing a plurality of M×N optical detectors, each being positioned and configured to measure an intensity respective of each optical interference signal of the plurality of optical interference signals to simultaneously and continuously generate a corresponding power output value 75;

automatically and separately changing a polarization of each of the input optical beams, while comparing the measured power output value of the respective optical interference signal with at least one previously measured power output value generated by the respective optical detector; wherein the changing of the polarization of each input optical beam is carried out directly based on the measured power output value of its respective optical interference signal 76; and locking the polarization of each respective input optical beam when reaching an extremum power output value of its respective optical interference signal 77.

Figure 8:
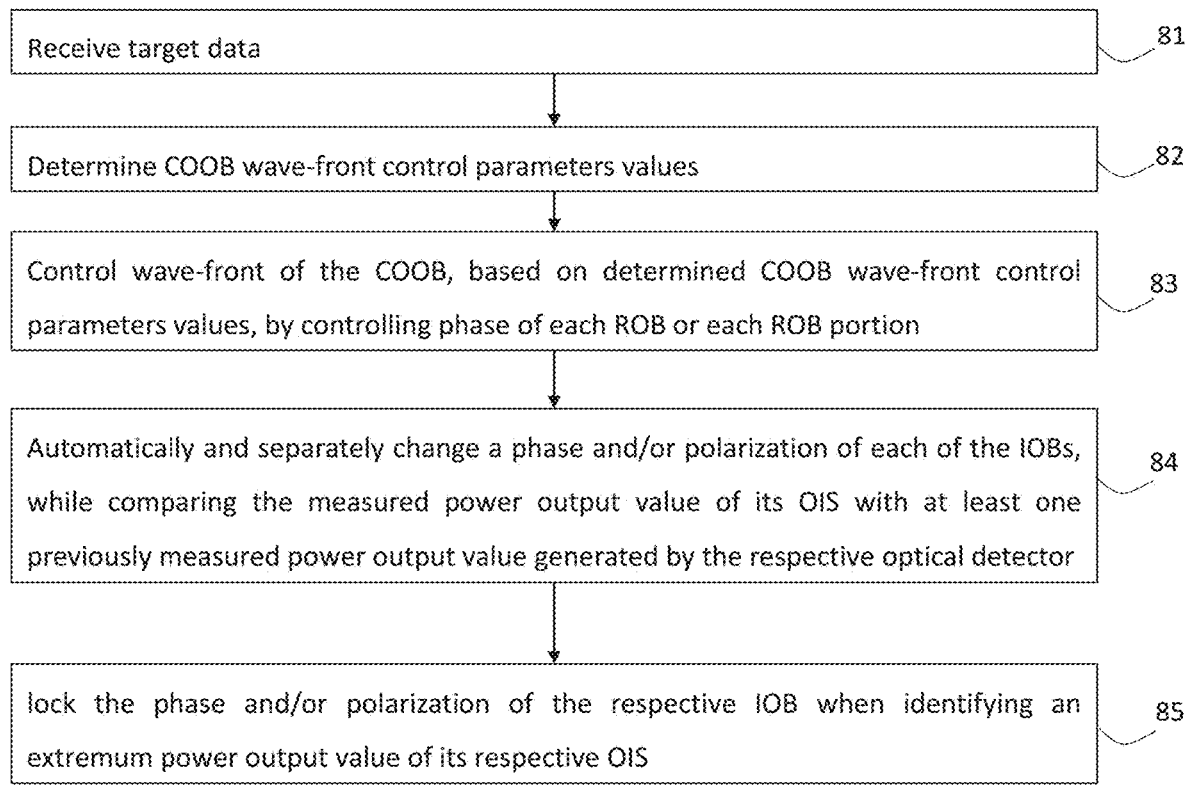
FIG. 8 shows combined output optical beam wave-front control process, using a CBC system with wave-front control, according to some embodiments.

Reference is made to FIG. 8, illustrating a wave-front control process, using a CBC system with wave-front control, according to some embodiments. This process may include:

receiving target data 81, e.g. indicative of one or more target characteristics values such as a target positioning, movement characteristics values (such as speed), etc.;

determining control parameter(s) value(s) for COOB wave-front control 82 (e.g. determining focusing and/or steering related parameters values for focusing and/or steering the COOB towards the target, based on the target positioning target data);

controlling the wave-front of the COOB, based on determined control parameter(s) value(s) 83, e.g. by generating and transmitting control commands and/or control signals for electronically/computer controlling of a focusing device and/or of a steering mechanism that can controllably change phase of each portion of the reference optical beam or each reference optical beam;

automatically and separately changing the phase and/or polarization of each of the input optical beams, while comparing the measured power output value of the respective optical interference signal with at least one previously measured power output value generated by the respective optical detector; wherein the changing of the phase/polarization of each input optical beam is carried out directly based on the measured power output value of its respective optical interference signal 84; and locking the phase and/or polarization of each respective input optical beam when reaching an extremum power output value of its respective optical interference signal 85.

Figure 9:
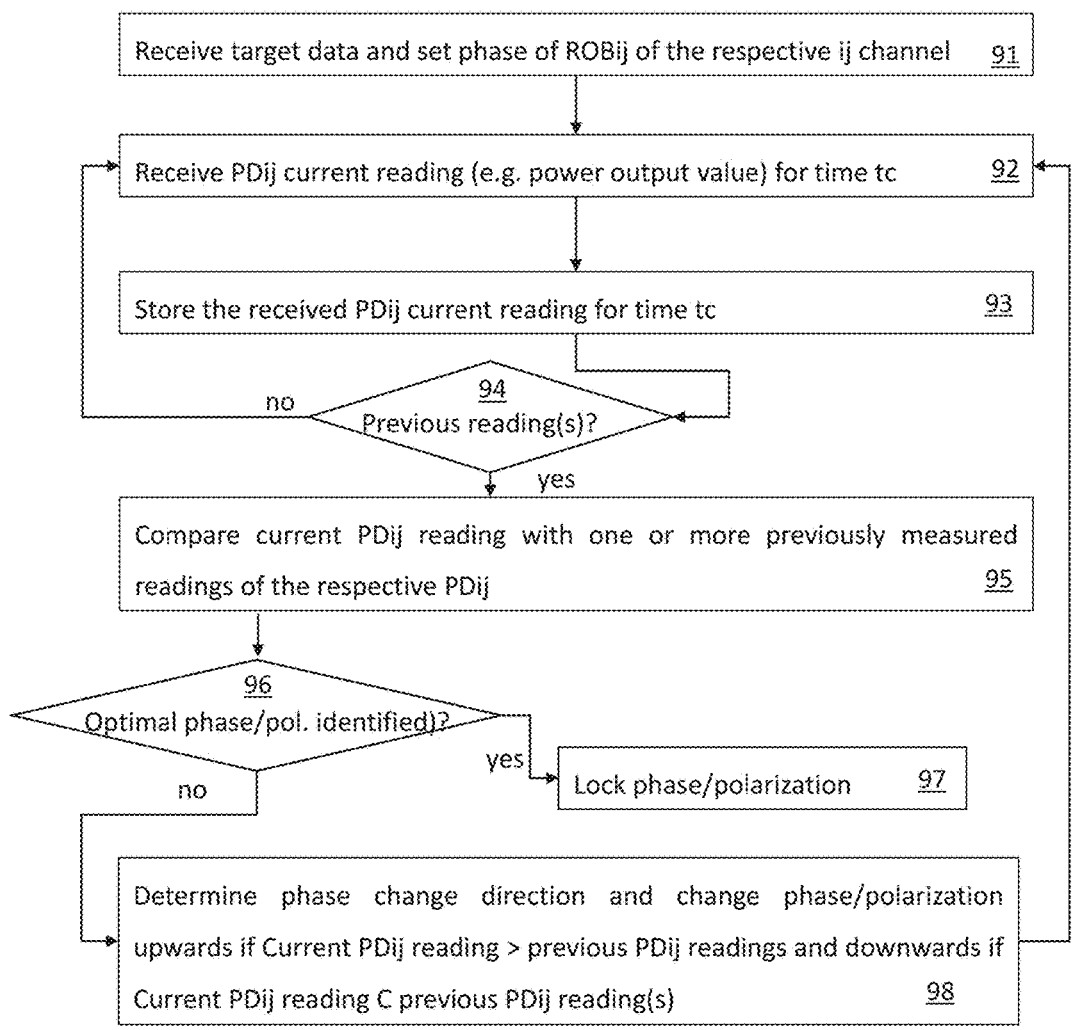
FIG. 9 shows a process of a CBC system phase locking and combined output optical beam wave-front control, based on received target data.

Reference is made to FIG. 9, illustrating an embodiment of a process of a CBC system phase locking and COOB wave-front control, using M×N channels and M×N PCMs, based on received target data. This process may include:

receiving target data and setting phase of each of the reference optical beams e.g. using the M×N array of PCMs, based on the received target data 91;

for each ij channel:

receiving PDij current intensity reading (at time tc) 92;

storing the received PDij current reading 93;

if the intensity reading of the respective channel is not the first 94 comparing the received PDij intensity reading with one or more previously received PDij intensity readings (e.g. limited number of previous intensity readings taken within a limited time-span) 95 and checking whether the current intensity reading is higher or lower than at least one of the one or more previously received intensity readings of the respective channel ij 96;

if an optimal phase of the IOBij that provides an extremum intensity reading within the time-span is identified 96, then the optimal phase is locked 97;

If the optimal phase is not identified, a phase change direction (e.g. increase or decrease) is determined and the respective phase of the IOBij is changed 98.

Steps 92-98 can be repeated for each channel and for each predefined time-span, for locking onto the optimal phase of each respective channel in a fast and efficient manner.

According to some embodiments, all phase and/or polarization locking mechanisms described above, allow extremely fast and efficient phase/polarization locking such that can enable locking the phase/polarization within a locking time $T_{lock}$ that is faster than or equal to the input optical beam phase/polarization change rate regardless of the environmental or other conditions influencing the input optical beams phase/polarization value instabilities (e.g. change and/or phase/polarization values fluctuations rate).

Examples

Example 1 is method for coherent beam combining (CBC) comprising:

generating a source optical beam, using a light source;

dividing the source optical beam into a M×N array of temporally coherent input optical beams and a reference optical beam;

generating M×N output optical beams corresponding to the M×N input optical beams such that the output optical beams propagate along a first propagation direction;

dividing each of the output optical beams such that a first portion of each of the output optical beams is directed towards the first propagation direction, all first portions of the output optical beams forming a combined output optical beam, and a second portion of each of the output optical beams is directed towards a second propagation direction and used as a sample optical beam;

directing the reference optical beam, such that the reference optical beam interferes with the sample optical beams, generating a plurality of corresponding optical interference signals;

providing a plurality of M×N optical detectors, each being positioned and configured to measure an overall intensity of a respective optical interference signal, and generate a power output value, indicative of the detected overall intensity of its respective optical interference signal;

automatically and separately changing a phase of each of the input optical beams, while comparing the measured power output value of its corresponding optical interference signal with at least one previously measured power output value generated by the respective optical detector, wherein the changing of the phase of each input optical beam is carried out directly based on the measured power output values of its respective optical interference signals, without calculating or estimating the correct phase and/or without producing any other signal associated therewith; and locking the phase of the input optical beam when reaching an extremum power output value of its respective optical interference signal, wherein the generating of the optical interference optical signals, measuring of the power output values of the multiple optical detectors and phase locking are carried out continuously and simultaneously for all M×N input and output optical beams and optical interference signals.

In example 2, the subject matter of example 1 may include, wherein the changing of the phase of each input optical beam is carried by using M×N phase shifters (PSs), each PS being configured to change the phase of a respective input optical beam, and M×N control modules (CMs), each CM being associated with a different PS and a corresponding optical detector and configured to iteratively transmit control commands to its associated PS, based on the power output value received from the respective optical detector.

In example 3, the subject matter of example 2 may include, wherein the control command for each input PS are indicative only of an increase or decrease direction of the respective phase, such that each PS increases or decreases the phase of the respective input optical beam by predefined and/or controllable phase shift span $\Delta\phi$.

In example 4, the subject matter of any one or more of examples 1 to 3 may include, wherein the step of generating the output optical beams is carried out using an array of M×N collimating elements for separately collimating each of the input optical beams.

In example 5, the subject matter of any one or more of examples 1 to 4 may include, wherein the method may further comprise controlling one or more characteristics of a wave-front of the combined output optical beam.

In example 6, the subject matter of example 5 includes, wherein the one or more characteristics the wave-front of the combined output optical beam comprises one or more of:
far field (FF) distribution of the wave-front;
FF position of a central lobe formable by the combined output optical beams;
central lobe focusing characteristics;
wave-front spatial configuration;
environmental optical aberrations corrections.

In example 7, the subject matter of any one or more of examples 5 to 6 may include, wherein the controlling of the one or more wave-front characteristics is carried out by controlling direction of a wave-front of the reference optical beam.

In example 8, the subject matter of example 7 may include, wherein the controlling of the wave-front of the reference optical beam is carried out by:
mechanically moving of an output end of an optical waveguide from which the reference optical beam is outputted; and/or
mechanically changing a relative positioning between the optical waveguide output end and a focusing lens located within the pathway of the reference optical beam.

In example 9, the subject matter of any one or more of examples 5 to 6 may include, wherein the controlling of the one or more wave-front characteristics is carried out by using an M×N array of phase controlling modules (PCMs), each PCM positioned and configured to control the phase of a different portion of the reference optical beam interfering with a respective sample optical beam.

In example 10, the subject matter of example 9 may include, wherein the M×N array of PCMs are electronically and/or digitally controllable.

In example 11, the subject matter of example 10 may include, wherein the M×N array of PCMs comprise a M×N array of spatial light modulators.

In example 12, the subject matter of any one or more of examples 5 to 11 may include, wherein the controlling of the one or more characteristics of the wave-front of the combined output optical beam is done according to a FF position of a target.

In example 13, the subject matter of any one or more of examples 1 to 12, wherein the method may further include controlling polarization of each of the input optical beams, based on the received power output value of its respective optical interference signal.

In example 14, the subject matter of example 13 may include, wherein the controlling of the polarization of each of the input optical beams comprises the steps of:
automatically, and separately changing the polarization of each of the input optical beams, while comparing the measured power output value of the respective optical interference signal with at least one previously measured power output value from the respective optical detector; and locking the polarization of each respective input optical beam when reaching an extremum power output value from the respective optical detector, wherein the changing of the polarization of each input optical beam is carried out directly based on the measured power output values of its respective optical interference signals, without calculating or estimating the correct polarization and/or without producing any other signal associated therewith.

In example 15, the subject matter of any one or more of examples 1 to 14, wherein the method may further include a controllably focusing of the combined output optical beam, using a controllable output beam collimating device.

Example 16 is a system for coherent beam combining (CBC) comprising:
a light source, generating a source optical beam;
a beam splitting mechanism, configured to divide the source optical beam into an array of M×N temporally coherent input optical beams and a reference optical beam;
an array of M×N collimating elements, configured to direct each of the input optical beams through a separate collimating element, generating M×N output optical beams corresponding to the input optical beams passed through the collimating elements, such that the output optical beams are parallel to one another, defining a first propagation direction;
a beam splitting element, configured to divide each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam;

an array of M×N optical detectors, each being positioned and configured to measure an overall intensity of a respective optical interference signal and output a power output value that corresponds to the overall intensity of the respective optical interference signal;

a control subsystem, configured to continuously receive measured power output values from each of the optical detectors, change a phase of each of the input optical beams, while comparing the measured power output value of the respective optical interference signal with at least one previously measured power output value from the respective optical detector, and lock the phase of the input optical beam when reaching an extremum power output value of its respective optical interference signal, wherein the changing of the phase of each input optical beam is carried out directly based on the measured power output values of its respective optical interference signals, without calculating or estimating the correct phase and/or without producing any other signal associated therewith, wherein the generating of the optical interference optical signals, measuring of the outputs of the multiple optical detectors and phase locking are carried out continuously and simultaneously for all M×N input and output optical beams and optical interference signals.

In example 17, the subject matter of example 16 may include, wherein the control subsystem comprises one or more of:

M×N phase shifters (PSs), each PS being configured to change the phase of a different input optical beam; and M×N processing modules (PMs), each PM being configured to receive power output value of a different optical detector and control a PS associated therewith, in an iterative manner.

In example 18, the subject matter of any one or more of examples 16 to 17, wherein the system may further include one or more of:

a reference optical fiber for guiding the reference beam, the optical fiber having an input end for inputting light from the light source and an output end from which the reference beam is emitted; and a reference beam collimator positioned such as to collimate the reference optical beam before interfering with the sample optical beams.

In example 19, the subject matter of any one or more of examples 16 to 18, wherein the system further includes a wave-front control mechanism, configured to control one or more characteristics of a wave-front of the combined output optical beam.

In example 20, the subject matter of example 19 may include, wherein the one or more characteristics of the wave-front of the combined output optical beam comprises one or more of:

far field (FF) distribution of the wave-front;
FF position of a central lobe formable by the combined output optical beams;
central lobe focusing characteristics;
wave-front spatial configuration;
environmental optical aberrations corrections.

In example 21, the subject matter of any one or more of examples 19 to 20 may include, wherein the wave-front control mechanism is configured to control a relative positioning between the reference optical fiber output end and the reference beam collimator, for steering control of the combined output optical beam.

In example 22, the subject matter of any one or more of examples 19 to 20, wherein the system further includes an M×N array of phase controlling modules (PCMs), each PCM positioned and configured to control the phase of a different portion of the reference optical beam interfering with a respective sample optical beam.

In example 23, the subject matter of example 22 may include, wherein the M×N array of PCMs are electronically and/or digitally controllable by the control subsystem or by a separate controller.

In example 24, the subject matter of example 23 may include, wherein the M×N array of PCMs comprise a M×N array of spatial light modulators (SLMs).

In example 25, the subject matter of any one or more of examples 19 to 24 may include, wherein the controlling of the one or more characteristics of the wave-front of the combined output optical beam is done according to a FF position of a target.

In example 26, the subject matter of any one or more of examples 16 to 25, wherein the system may further include M×N polarization controllers (PCs) each PC being associated with a different PM and configured to control polarization of each of the input optical beams, based on the received power output value of its respective measured power output value.

In example 27, the subject matter of example 26 may include, wherein the controlling of the polarization of each of the input optical beams comprises:

automatically, and separately changing the polarization of each of the input optical beams, while comparing the measured power output value of the respective optical interference signal with at least one previously measured power output value of the respective optical interference signal; and locking the polarization of each respective input optical beam when reaching an extremum power output value of its respective optical interference signal, wherein the changing of the polarization of each input optical beam is carried out directly based on the measured power output values of its respective optical interference signals, without calculating or estimating the correct polarization and/or without producing any other signal associated therewith.

In example 28, the subject matter of any one or more of examples 16 to 27, wherein the system may further include a focusing device, configured and position to controllably focus the combined output optical beam.

In example 29, the subject matter of any one or more of examples 16 to 28, wherein the system may further include an array of M×N optical waveguides, each being configured to guide therethrough a different input optical beam and/or an output optical beam.

In example 30, the subject matter of example 29 may include, wherein the optical waveguides are: optical fibers, fiber amplifiers, doped fibers.

Example 31 is a method for coherent beam combining (CBC) comprising:

providing a M×N array of temporally coherent input optical beams;
providing a reference optical beam;
generating M×N output optical beams corresponding to the M×N input optical beams such that the output optical beams propagate along a first propagation direction;
dividing each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam;

directing the reference optical beam, such that the reference optical beam interferes with the sample optical beams, generating a plurality of optical interference signals;

providing a plurality of M×N optical detectors, each being positioned and configured to measure an overall intensity respective of each optical interference signal of the plurality of optical interference signals to generate a power output value that corresponds to the overall intensity of the respective optical interference signal;

automatically and separately changing a phase of each of the input optical beams, while comparing the measured power output value of the respective optical interference signal with at least one previously measured power output value generated by the respective optical detector; wherein the changing of the phase of each input optical beam is carried out directly based on the measured power output value of its respective optical interference signal; and locking the phase of the input optical beam when reaching an extremum power output value of its respective optical interference signal, wherein the generating of the optical interference optical signals, measuring of the outputs of the multiple optical detectors and phase locking are carried out continuously and simultaneously for all M×N input and output optical beams and optical interference signals.

Example 32 is a system for coherent beam combining (CBC) comprising:

an array of M×N temporally coherent input optical beams;

a reference optical beam;

an array of M×N collimating elements, configured to direct each of the input optical beams through a separate collimating element, generating M×N output optical beams corresponding to the input optical beams passed through the collimating elements, such that the output optical beams are parallel to one another, defining a first propagation direction;

a beam splitting element, configured to divide each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam, directed such as to interfere with the reference optical beam, generating a plurality of optical interference signals;

a plurality of optical detectors, each being positioned and configured to measure an overall intensity of a respective optical interference signal and output a power output value that corresponds to the overall intensity of the respective optical interference signal; and a control subsystem, configured to continuously receive measured power output values from each of the optical detectors, change a phase of each of the input optical beams, while comparing the measured power output value of the respective optical interference signal with at least one previously measured power output value from the respective optical detector, and lock the phase of the input optical beam when reaching an extremum power output value of its respective optical interference signal, wherein the changing of the phase of each input optical beam is carried out directly based on the measured power output value of its respective optical interference signal, wherein the generating of the optical interference optical signals, measuring of the outputs of the multiple optical detectors and phase locking are carried out continuously and simultaneously for all M×N input and output optical beams and optical interference signals.

While the invention has been described with respect to a limited number of embodiments, these should not be construed as limitations on the scope of the invention, but rather as exemplifications of some of the embodiments.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module, a device, a mechanism, a unit and or a subsystem may each comprise a machine or machines executable instructions (e.g. commands). A module may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of those elements. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The invention claimed is:

1. A method for coherent beam combining (CBC) comprising:
   generating a source optical beam, using a light source;
   dividing the source optical beam into a M×N array of temporally coherent input optical beams and a reference optical beam;
   generating M×N output optical beams corresponding to the M×N input optical beams such that the output optical beams propagate along a first propagation direction;
   dividing each of the output optical beams such that a first portion of each of the output optical beams is directed towards the first propagation direction, all first portions of the output optical beams forming a combined output optical beam, and a second portion of each of the output optical beams is directed towards a second propagation direction and used as a sample optical beam;
   directing the reference optical beam, such that the reference optical beam interferes with the sample optical beams, generating a plurality of corresponding optical interference signals;
   providing a plurality of M×N optical detectors, each being positioned and configured to measure intensity of a respective optical interference signal, and generate a power output value, indicative of the overall intensity of the respective optical interference signal;
   automatically and separately changing a phase of each of the input optical beams, while comparing the measured power output value of its corresponding optical interference signal with at least one previously measured power output value generated by the respective optical detector, wherein the changing of the phase of each input optical beam is carried out directly based on the measured power output values of its respective optical interference signals, without calculating or estimating the correct phase and/or without producing any other signal associated therewith;
   locking the phase of the input optical beam when reaching an extremum power output value of its respective optical interference signal, and
   wherein the generating of the optical interference optical signals, measuring of the power output values of the multiple optical detectors and phase locking are carried out continuously and simultaneously for all M×N input and output optical beams and optical interference signals.

2. The method of claim 1, wherein the changing of the phase of each input optical beam is carried by using M×N phase shifters (PSs), each PS being configured to change the phase of a respective input optical beam,
   and M×N control modules (CMs), each CM being associated with a different PS and a corresponding optical detector and configured to iteratively transmit control commands to its associated PS, based on the power output value received from the respective optical detector.

3. The method of claim 2, wherein the control commands for each input PS are indicative only of an increase or decrease direction of the respective phase, such that each PS increases or decreases the phase of the respective input optical beam by predefined and/or controllable phase shift span.

4. The method of claim 1, wherein the step of generating the output optical beams is carried out using an array of M×N collimating elements for separately collimating each of the input optical beams.

5. The method of claim 1 to further comprising controlling one or more characteristics of a wave-front of the combined output optical beam.

6. The method of claim 5, wherein the one or more characteristics of the wave-front of the combined output optical beam comprises one or more of:
   far field (FF) distribution of the wave-front;
   FF position of a central lobe formable by the combined output optical beams;
   central lobe focusing characteristics;
   wave-front spatial configuration;
   environmental optical aberrations corrections.

7. The method of claim 5, wherein the controlling of the one or more wave-front characteristics is carried out by controlling direction of a wave-front of the reference optical beam.

8. The method of claim 7, wherein the controlling of the wave-front of the reference optical beam is carried out by:
   mechanically moving of an output end of an optical waveguide from which the reference optical beam is outputted; and/or
   mechanically changing a relative positioning between an output end of an optical waveguide, from which the reference optical beam is outputted, and a focusing lens located within a pathway of the reference optical beam.

9. The method of claim 5, wherein the controlling of the one or more wave-front characteristics is carried out by using an M×N array of phase controlling modules (PCMs), each PCM positioned and configured to control the phase of a different portion of the reference optical beam interfering with a respective sample optical beam.

10. The method of claim 1 further comprising controlling polarization of each of the input optical beams, based on the measured power output value of its respective optical interference signal,
   wherein the controlling of the polarization of each of the input optical beams comprises the steps of:
      automatically, and separately changing the polarization of each of the input optical beams, while comparing the measured power output value of the respective optical interference signal with at least one previously measured power output value from the respective optical detector; and
      locking the polarization of each respective input optical beam when reaching an extremum power output value from the respective optical detector,
   wherein the changing of the polarization of each input optical beam is carried out directly based on the measured power output values of its respective optical interference signals, without calculating or estimating the correct polarization and/or without producing any other signal associated therewith.

11. A system for coherent beam combining (CBC) comprising:

a light source, generating a source optical beam;
a beam splitting mechanism, configured to divide the source optical beam into an array of M×N temporally coherent input optical beams and a reference optical beam;
an array of M×N collimating elements, configured to direct each of the input optical beams through a separate collimating element, generating M×N output optical beams corresponding to the input optical beams passed through thidenticale collimating elements, such that the output optical beams are parallel to one another, defining a first propagation direction;
a beam splitting element, configured to divide each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam;
an array of M×N optical detectors, each being positioned and configured to measure intensity of a respective optical interference signal and output a power output value that corresponds to the overall intensity of the respective optical interference signal;
a control subsystem, configured to continuously receive measured power output values from each of the optical detectors, change a phase of each of the input optical beams, while comparing the measured power output value of the respective optical interference signal with at least one previously measured power output value from the respective optical detector, and lock the phase of the input optical beam when reaching an extremum power output value of its respective optical interference signal,
wherein the changing of the phase of each input optical beam is carried out directly based on the measured power output values of its respective optical interference signals, without calculating or estimating the correct phase and/or without producing any other signal associated therewith,
wherein the generating of the optical interference optical signals, measuring of the outputs of the multiple optical detectors and phase locking are carried out continuously and simultaneously for all M×N input and output optical beams and optical interference signals.

12. The system of claim 11, wherein the control subsystem comprises one or more of:
M×N phase shifters (PSs), each PS being configured to change the phase of a different input optical beam; and
M×N processing modules (PMs), each PM being configured to receive power output value of a different optical detector and control a PS associated therewith, in an iterative manner.

13. The system of claim 11 further comprising one or more of:
a reference optical fiber for guiding the reference beam, the optical fiber having an input end for inputting light from the light source and an output end from which the reference beam is emitted; and
a reference beam collimator positioned such as to collimate the reference optical beam before interfering with the sample optical beams.

14. The system of claim 11 further comprising a wave-front control mechanism, configured to control one or more characteristics of a wave-front of the combined output optical beam.

15. The system of claim 14, wherein the wave-front control mechanism is configured to control a relative positioning between the reference optical fiber output end and the reference beam collimator, for steering control of the combined output optical beam.

16. The system of claim 14 further comprising an M×N array of phase controlling modules (PCMs), each PCM positioned and configured to control the phase of a different portion of the reference optical beam interfering with a respective sample optical beam.

17. The system of claim 11 further comprising M×N polarization controllers (PCs) each PC being associated with a different PM and configured to control polarization of each of the input optical beams, based on the measured power output value of its respective measured power output value.

18. The system of claim 17, wherein the controlling of the polarization of each of the input optical beams comprises:
automatically, and separately changing the polarization of each of the input optical beams, while comparing the measured power output value of the respective optical interference signal with at least one previously measured power output value of the respective optical interference signal; and
locking the polarization of each respective input optical beam when reaching an extremum power output value of its respective optical interference signal,
wherein the changing of the polarization of each input optical beam is carried out directly based on the measured power output values of its respective optical interference signals, without calculating or estimating the correct polarization and/or without producing any other signal associated therewith.

19. The system of claim 11 further comprising: a focusing device, configured and position to controllably focus the combined output optical beam; and/or
an array of M×N optical waveguides, each being configured to guide therethrough a different input optical beam and/or an output optical beam; and
wherein the optical waveguides are: optical fibers, fiber amplifiers, doped fibers.

20. The system of claim 19, wherein each optical fiber of the M×N array of optical fibers is connected to a different collimating element of the M×N array of collimating elements; and/or wherein the collimating elements of the M×N array of collimating elements are connected to one another such as to form a single element of collimating elements array.

21. A system for coherent beam combining (CBC) comprising:
an array of M×N temporally coherent input optical beams;
a reference optical beam;
an array of M×N collimating elements, configured to direct each of the input optical beams through a separate collimating element, generating M×N output optical beams corresponding to the input optical beams passed through the collimating elements, such that the output optical beams are parallel to one another, defining a first propagation direction;
a beam splitting element, configured to divide each of the output optical beams such that a first portion of each of the output optical beams is directed towards the first propagation direction, all first portions of the output optical beams forming a combined output optical beam and a second portion of each of the output optical beams is directed towards a second propagation direction and used as a sample optical beam, directed such as to interfere with the reference optical beam, generating a plurality of optical interference signals;

a plurality of optical detectors, each being positioned and configured to measure intensity of a respective optical interference signal and output a power output value that corresponds to the overall intensity of the respective optical interference signal; and a control subsystem, configured to continuously receive measured power output values from each of the optical detectors, change a phase of each of the input optical beams, while comparing the measured power output value of the respective optical interference signal with at least one previously measured power output value from the respective optical detector, and lock the phase of the input optical beam when reaching an extremum power output value of its respective optical interference signal, wherein the changing of the phase of each input optical beam is carried out directly based on the measured power output value of its respective optical interference signal, wherein the generating of the optical interference optical signals, measuring of the outputs of the multiple optical detectors and phase locking are carried out continuously and simultaneously for all M×N input and output optical beams and optical interference signals.

* * * * *